(12) United States Patent
Nishida et al.

(10) Patent No.: US 10,070,066 B2
(45) Date of Patent: Sep. 4, 2018

(54) COORDINATE CALCULATOR AND COORDINATE CALCULATION SYSTEM

(71) Applicants: En Nishida, Tokyo (JP); Yuu Kodama, Kanagawa (JP)

(72) Inventors: En Nishida, Tokyo (JP); Yuu Kodama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/369,226

(22) Filed: Dec. 5, 2016

(65) Prior Publication Data
US 2017/0193664 A1   Jul. 6, 2017

(30) Foreign Application Priority Data

Jan. 5, 2016   (JP) .................. 2016-000474
Oct. 13, 2016  (JP) .................. 2016-201537

(51) Int. Cl.
| H04N 5/232 | (2006.01) |
| H04N 5/225 | (2006.01) |
| G06F 3/041 | (2006.01) |
| G06F 3/0488 | (2013.01) |
| H04N 5/77 | (2006.01) |
| G06F 3/042 | (2006.01) |

(52) U.S. Cl.
CPC ......... *H04N 5/23293* (2013.01); *G06F 3/042* (2013.01); *G06F 3/0416* (2013.01); *G06F 3/0418* (2013.01); *H04N 5/2258* (2013.01); *H04N 5/77* (2013.01); *G06F 3/04883* (2013.01); *G06T 2207/30204* (2013.01)

(58) Field of Classification Search
None
See application file for complete search history.

(56) References Cited

U.S. PATENT DOCUMENTS

| 6,353,434 B1 | 3/2002 | Akebi et al. |
| 8,504,944 B2 | 8/2013 | Yamaguchi |
| 2008/0228422 A1 | 9/2008 | Satoh |

(Continued)

FOREIGN PATENT DOCUMENTS

| EP | 2280334 A2 | 2/2011 |
| JP | 2000-089913 | 3/2000 |

(Continued)

OTHER PUBLICATIONS

Extended European Search Report dated May 17, 2017 issued in corresponding European Application No. 16203244.5.

*Primary Examiner* — Mark T Monk
(74) *Attorney, Agent, or Firm* — Harness, Dickey & Pierce, P.L.C.

(57) ABSTRACT

A coordinate calculator includes: an image processing unit configured to calculate a coordinate of an attention point from each of a plurality of images captured by a plurality of imaging units; a transmitter configured to transmit the calculated coordinate to a connected separate information processing device using a built-in function included in an operating system of the information processing device; a receiver configured to receive calibration information of the imaging unit, the calibration information being calculated by the information processing device based on the transmitted coordinate and transmitted by the information processing device using a built-in function included in the operating system of the information processing device; and a storage unit configured to store therein the received calibration information.

10 Claims, 8 Drawing Sheets

(56) References Cited

U.S. PATENT DOCUMENTS

| | | |
|---|---|---|
| 2011/0025650 A1 | 2/2011 | Joscelyne |
| 2013/0257822 A1 | 10/2013 | Holmgren et al. |
| 2014/0035847 A1 | 2/2014 | Kodama et al. |
| 2014/0192058 A1 | 7/2014 | Kodama et al. |
| 2014/0354546 A1 | 12/2014 | Lin et al. |
| 2015/0153846 A1 | 6/2015 | Nishida |
| 2016/0154477 A1 | 6/2016 | Nishida et al. |

FOREIGN PATENT DOCUMENTS

| | | |
|---|---|---|
| JP | 2007-265417 | 10/2007 |
| JP | 2011-210188 | 10/2011 |

COORDINATE CALCULATOR AND COORDINATE CALCULATION SYSTEM

CROSS-REFERENCE TO RELATED APPLICATIONS

The present application claims priority under 35 U.S.C. § 119 to Japanese Patent Application No. 2016-000474 filed Jan. 5, 2016 and Japanese Patent Application No. 2016-201537 filed Oct. 13, 2016. The contents of which are incorporated herein by reference in their entirety.

BACKGROUND OF THE INVENTION

1. Field of the Invention

The present invention relates to a coordinate calculator and a coordinate calculation system.

2. Description of the Related Art

An interactive white board (hereinafter referred to as an IWB) is known that receives touch interactions, handwriting, and others. Examples of the IWB include an optical IWB employing a camera sensor.

Japanese Unexamined Patent Application Publication No. 2000-089913 describes calibration of a touch panel input coordinate transformation device. With the technique of Japanese Unexamined Patent Application Publication No. 2000-089913 using a calibration application, a mark image for calibration is displayed on a display device. When the mark is pressed with a finger, a pen, or the like, coordinates detected through the touch panel is transmitted to an operating system (OS) of a personal computer (PC). The PC performs calibration using the coordinates and coordinates of the mark image.

However, such a conventional technique is supposed to use an IWB with a built-in PC and causes the built-in PC to perform all calculation including coordinate calculation, drawing processing using the calculated coordinates, calibration, and others. This configuration problematically restricts a reduction in size of the device. To overcome the problem, such a method is employed that causes hardware (for example, a small digital signal processor (DSP)) to perform constantly necessary coordinate calculation and causes a connected external PC to perform correction calculation such as calibration used in a limited opportunity, for example, in setting up the device. With the method, however, dedicated hardware is controlled by the connected external PC, and thus development of a dedicated driver and installation thereof on the connected external PC are required.

From the above-described viewpoints, there is a need to provide a coordinate calculator and a coordinate calculation system easily configured even when processing relating to coordinate calculation is executed by the dedicated hardware.

SUMMARY OF THE INVENTION

According to exemplary embodiments of the present invention, there is provided a coordinate calculator comprising: an image processing unit configured to calculate a coordinate of an attention point from each of a plurality of images captured by a plurality of imaging units; a transmitter configured to transmit the calculated coordinate to a connected separate information processing device using a built-in function included in an operating system of the information processing device; a receiver configured to receive calibration information of the imaging unit, the calibration information being calculated by the information processing device based on the transmitted coordinate and transmitted by the information processing device using a built-in function included in the operating system of the information processing device; and a storage unit configured to store therein the received calibration information.

Exemplary embodiments of the present invention also provide a coordinate calculation system including an information processing device and a coordinate calculator, wherein the coordinate calculator includes: an image processing unit configured to calculate a coordinate of an attention point from each of a plurality of images captured by a plurality of imaging units; a first transmitter configured to transmit the calculated coordinate to a connected separate image processing device using a built-in function included in an operating system of the information processing device; a receiver configured to receive calibration information of the imaging unit, the calibration information being calculated by the information processing device based on the transmitted coordinate and transmitted by the information processing device using a built-in function included in the operating system of the information processing device; and a storage unit configured to store therein the received calibration information, and the image processing device includes: a calculating unit configured to calculate the calibration information based on the coordinate transmitted from the coordinate calculator using a built-in function included in the operating system of the information processing device, the coordinate being received by the information processing device; and a second transmitter configured to transmit the calculated calibration information to the coordinate calculator using a built-in function included in the operating system of the information processing device.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Embodiments of a coordinate calculator and a coordinate calculation system according to the present invention will now be described with reference to the accompanying drawings.

Figure 1:
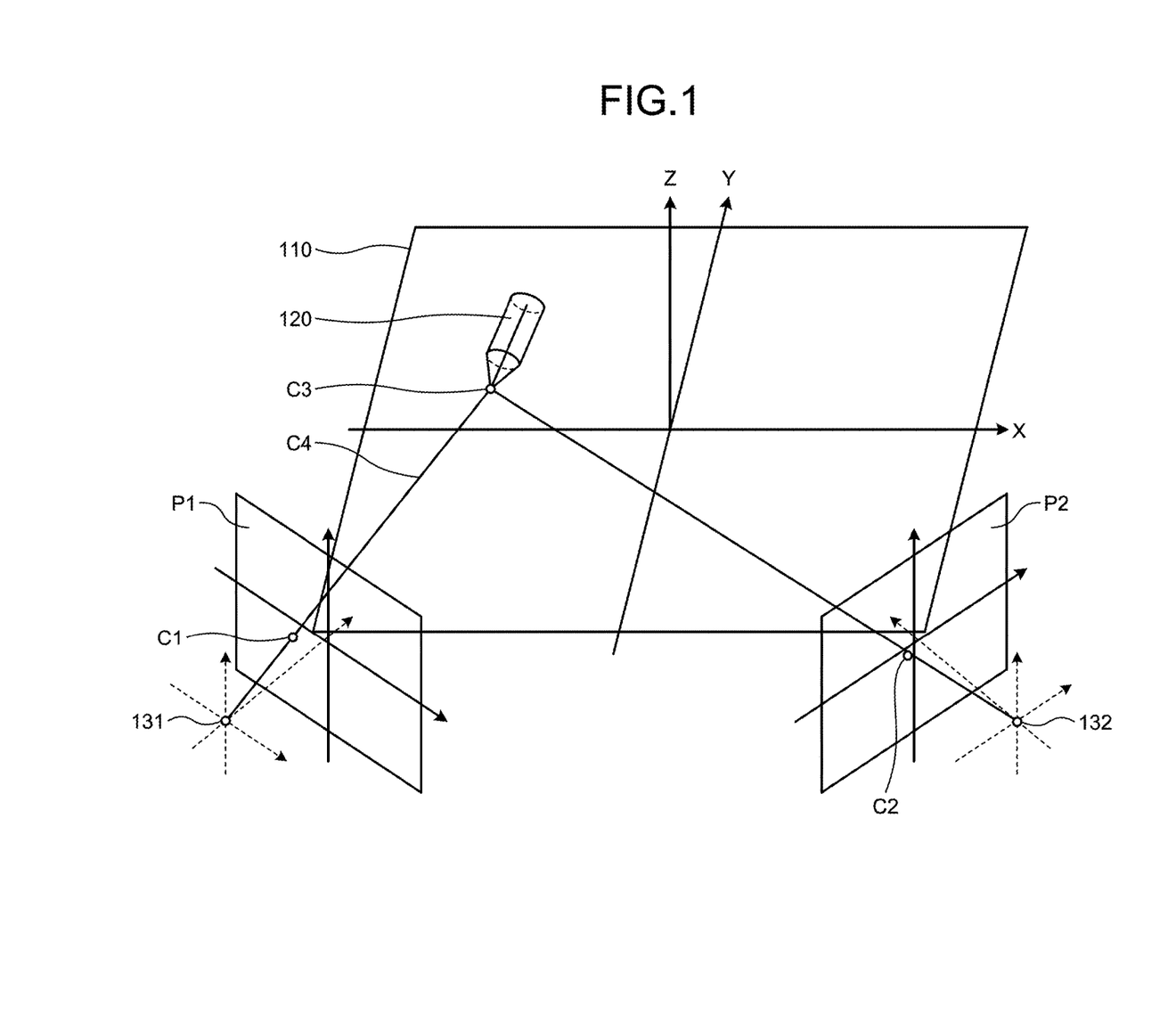
FIG. 1 is an illustrative drawing generally depicting a method of coordinate calculation in a coordinate calculation system according to an embodiment of the present invention.

FIG. 1 is an illustrative drawing generally depicting a method of coordinate calculation in the coordinate calculation system of the embodiment. Specifically, FIG. 1 illustrates an example with the coordinate calculation system configured as an optical IWB. As illustrated in FIG. 1, the coordinate calculation system includes a display 110 (a display unit), cameras 131 and 132 (imaging units) and a pointer 120.

Examples of the pointer 120 include an electronic pen for pointing a position on the display 110 and others. A finger of a user may replace the pointer 120. The display 110 is an example of a display device displaying information. By detecting coordinates of a handwritten text and the like input by a user and displaying information at a position corresponding to the coordinates, the hand-written text can be displayed in such a manner that overlaps with the information displayed on the display 110. The surface for the handwritten input on the display 110 may be hereinafter referred to as a handwriting plane.

Images of the handwriting plane are captured by the cameras 131 and 132 when the pointer 120 touches the handwriting plane. The position (coordinates of an attention point) of the pointer 120 is detected from the captured images. In the following description, coordinates detected on the image will be referred to as image coordinates and represented as (x, y) using small letters x and y. For example, image coordinates C1 detected from an image captured by the camera 131 are represented as $(x_1, y_1)$. Image coordinates C2 detected from an image captured by the camera 132 are represented as $(x_2, y_2)$. The image coordinates C1 are coordinates on an image plane P1 including the coordinate system of an image captured by the camera 131. The image coordinates C2 are coordinates on an image plane P2 including the coordinate system of an image captured by the camera 132. The number of cameras is not limited to two but may be more than two.

With the coordinate calculation system, sets of image coordinates are calculated based on images captured by at least two or more cameras. World coordinates C3 of the pointer 120 on the handwriting plane are calculated based on specific relations C4 with the sets of image coordinates. In the following description, the world coordinates will be represented as (X, Y) or $(X_{world}, Y_{world})$ using large letters X and Y. The calculated world coordinates can be used in, for example, drawing a trajectory input by handwriting.

As illustrated in FIG. 1, the relation C4 between the image coordinates and the world coordinates is used in calculating the world coordinates. In the initial condition, the relation C4 is unknown, and calibration is thus performed to calculate the relation C4. With calibration, information (calibration information) for determining the relation C4 is calculated. In the following description, this information will be referred to as a calibration parameter.

Any conventional method of calibration is applicable. For example, such a method is applicable that the user touches a mark at a certain position on the display 110 with the pointer 120 to cause calibration to be performed using image coordinates of the touch. More specifically, calibration is performed in the following procedure. (1) Display a mark at a certain position on the display 110, so that the user touches the position of the mark with the pointer 120. (2) Calculate image coordinates of the touched position. (3) Calculate a calibration parameter using sets of image coordinates calculated on a plurality of marks displayed on predetermined positions of the world coordinates. The calculated calibration parameter is stored and used when image coordinates calculated upon writing or a touch operation are transformed to world coordinates.

The following processing is applied for the above-described calibration using a conventional IWB with a built-in PC. (1') Using a dedicated application for calibration that operates on the PC, the IWB displays a mark on predetermined world coordinates, so that the user touches the position of the mark with the pointer 120. (2') Image coordinates of the touched position are transmitted to a driver (for example, a touch panel device driver) of the IWB to be transmitted to an OS of the PC. (3') The dedicated application for calibration executed by the built-in PC calculates a calibration parameter using the transmitted image coordinates and the world coordinates of the mark.

With this configuration, the built-in PC executes various calculation processing, which may restrict an increase in the processing speed depending on the performance of the built-in PC. Specifically, the built-in PC executes processing of coordinate calculation and the like, thereby restricting an increase in the processing speed. Furthermore, a large IWB is being requested for use in offices and for educational use, and an increase in the size of the handwriting plane thus may be requested. In such a case, the size of the whole device problematically increases by employing the configuration with a built-in PC.

In this embodiment, at least a part of the processing is executed by a hardware circuit such as a printed circuit board (PCB) so as to increase the processing speed with respect to coordinate calculation. Calibration is an application program that encourages a user to perform operation through processing for displaying a mark as described above, in other words, using a graphical user interface (GUI), and executes processing based on the result of the operation executed by the user. From this viewpoint, it is preferable that the processing using the GUI be operated by the PC with higher operability than that of the IWB. On the other hand, it is preferable that a calibration parameter as a result of calibration be stored in the PCB because the parameter is data for correcting coordinate values output by the IWB. Considering these points, the embodiment achieves a method of calibration using a PCB in a coordinate calculation system.

For example, the following functions are implemented in the embodiment. (F1) In order that a connected PC can receive coordinate data regardless of the type of the PC, output the coordinate data complying with a standard and having image coordinates embedded therein from the PCB (IWB) to the connected PC. With this process, the PC operating an application for calibration can receive image coordinates. (F2) The PCB inputs a calibration parameter output from the PC. (F3) The PCB stores therein and updates the calibration parameter.

As the standard, a universal serial bus (USB) human interface device (HID) may be used. In this case, the PCB and the PC are connected with each other via a USB and the like. The image coordinates are embedded in, for example, an HID report and transmitted.

Figure 2:
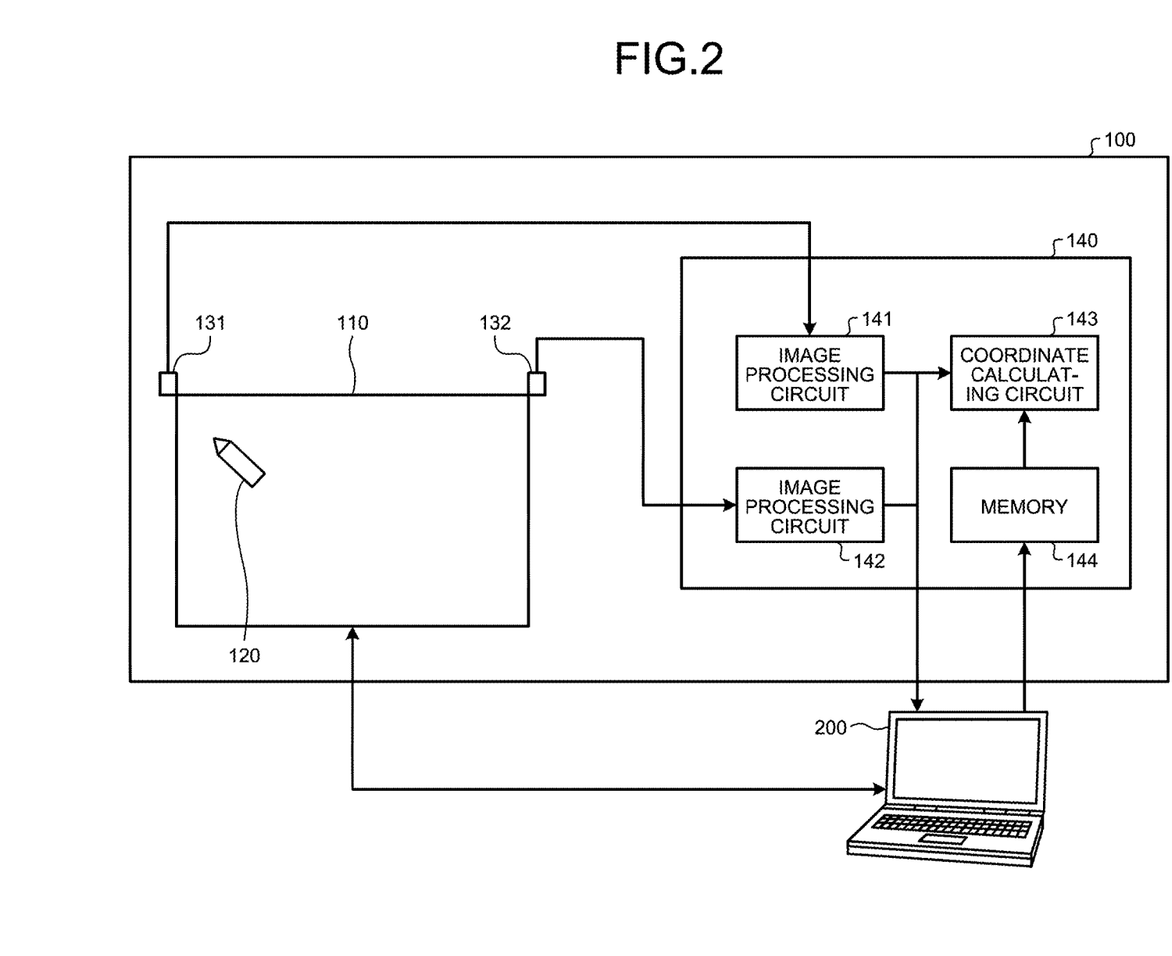
FIG. 2 is a block diagram illustrating an example of hardware configuration of the coordinate calculation system according to the embodiment.

FIG. 2 is a block diagram illustrating an example of hardware configuration of the coordinate calculation system according to the embodiment. As illustrated in FIG. 2, the coordinate calculation system includes an IWB 100 and a PC 200 connected with the IWB 100 as a separate device to the IWB 100. The IWB 100 includes the display 110, cameras 131 and 132, and a PCB 140 serving as a control circuit. The coordinate calculator can be implemented by the PCB 140 or the IWB 100 including the PCB 140.

The respective cameras 131 and 132 are installed, for example, to the left upper end and the right upper end of the frame of the display 110 such that each of the cameras can capture an image of the whole board surface (handwriting plane) of the display 110. The cameras 131 and 132 capture images including the pointer 120, for example, when the pointer 120 touches the board surface.

The PCB 140 can be configured in a manner integrated with the display 110 or built in to the display 110, thereby reducing the size of the whole system. The PCB 140 has image processing circuits 141 and 142, a coordinate calculating circuit 143, and a memory 144. The memory 144 is a storage unit storing therein various kinds of information used for various kinds of processing. For example, the memory 144 stores therein a calibration parameter received from the PC 200.

The respective image processing circuits 141 and 142 input images captured by the cameras 131 and 132 and perform image processing on the input images. The image processing includes processing for calculating image coordinates of the pointer 120 from the image. The method of calculating image coordinates will be later described in detail.

The coordinate calculating circuit 143 calculates world coordinates of the pointer 120 based on the calibration parameter stored in the memory 144 and sets of image coordinates calculated by the image processing circuits 141 and 142.

The image processing circuits 141 and 142 and the coordinate calculating circuit 143 can be configured with any hardware circuit such as an application specific integrated circuit (ASIC) and a field-programmable gate array (FPGA). Calculating coordinates using dedicated hardware can increase the speed of the coordinate calculation processing. Furthermore, using dedicated hardware instead of using a built-in PC for general processing can reduce the size of the device. The memory 144 can be configured with any recording medium such as a random access memory (RAM) and a flash memory. A part of or the whole of each circuit may be separately implemented or may be shared by one another.

The PC 200 is an information processing device configured with a general-purpose notebook computer and the like. The PC 200 is connected with the display 110 via a display cable or the like. The PC 200 is connected with the PCB 140 via a USB cable or the like. Information displayed on a display device (such as a display) of the PC 200 can be accordingly displayed on the display 110, and furthermore, the IWB 100 (the PCB 140) can be controlled by a computer program of the PC 200 or the like.

Figure 3:
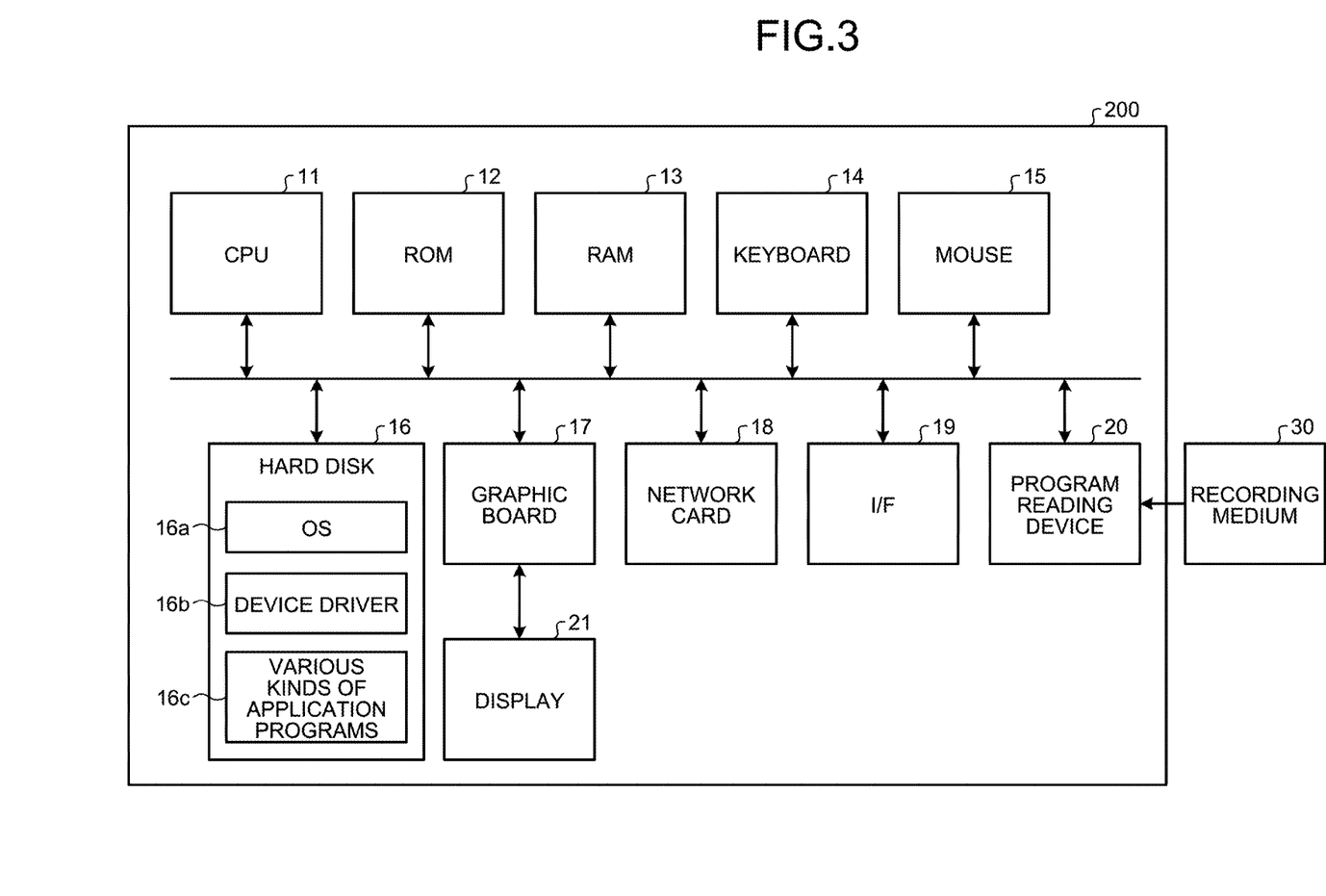
FIG. 3 is a drawing illustrating an example of hardware configuration of a PC of the embodiment.

FIG. 3 is a drawing illustrating an example of hardware configuration of the PC 200. As illustrated in FIG. 3, the PC 200 includes a central processing unit (CPU) 11, a read only memory (ROM) 12, a RAM 13, a keyboard 14, a mouse 15, a hard disk 16, a graphic board 17, a network card 18, an interface (I/F) 19, a program reading device 20, and a display 21.

The CPU 11 provides an overall control on the PC 200. The ROM 12 records a boot program and others. The RAM 13 is used as a work area of the CPU 11. The keyboard 14 is an input device for inputting text, numerical values, various kinds of instructions, and others. The mouse 15 is an input device for moving a cursor, selecting a range, and others.

The hard disk 16 stores therein an OS 16a, a device driver 16b, various kinds of application programs 16c, and others. The device driver 16b is a computer program for operating each unit. Any computer program may be applicable for the various kinds of application programs 16c. The various kinds of application programs 16c may include drawing software, word processor software, spreadsheet software, presentation software, calibration software, and the like.

The graphic board 17 is connected to the display 21 and controls display of images on the display 21. The network card 18 is used for connection to a network. The I/F 19 is used for connection with an external device such as a printer.

The program reading device 20 is a device for reading a program code recorded in a recording medium 30 and configured with an optical disk drive and the like. The recording medium 30 may record various kinds of program codes (control programs) of the OS 16a, the device driver 16b, various kinds of application programs 16c, and others. The recording medium 30 can use any medium such as a hard disk, an optical disk (a CD-ROM, a CD-R, a CD-R/w, a DVD-ROM, a DVD-RAM, and the like), and a memory card.

Figure 4:
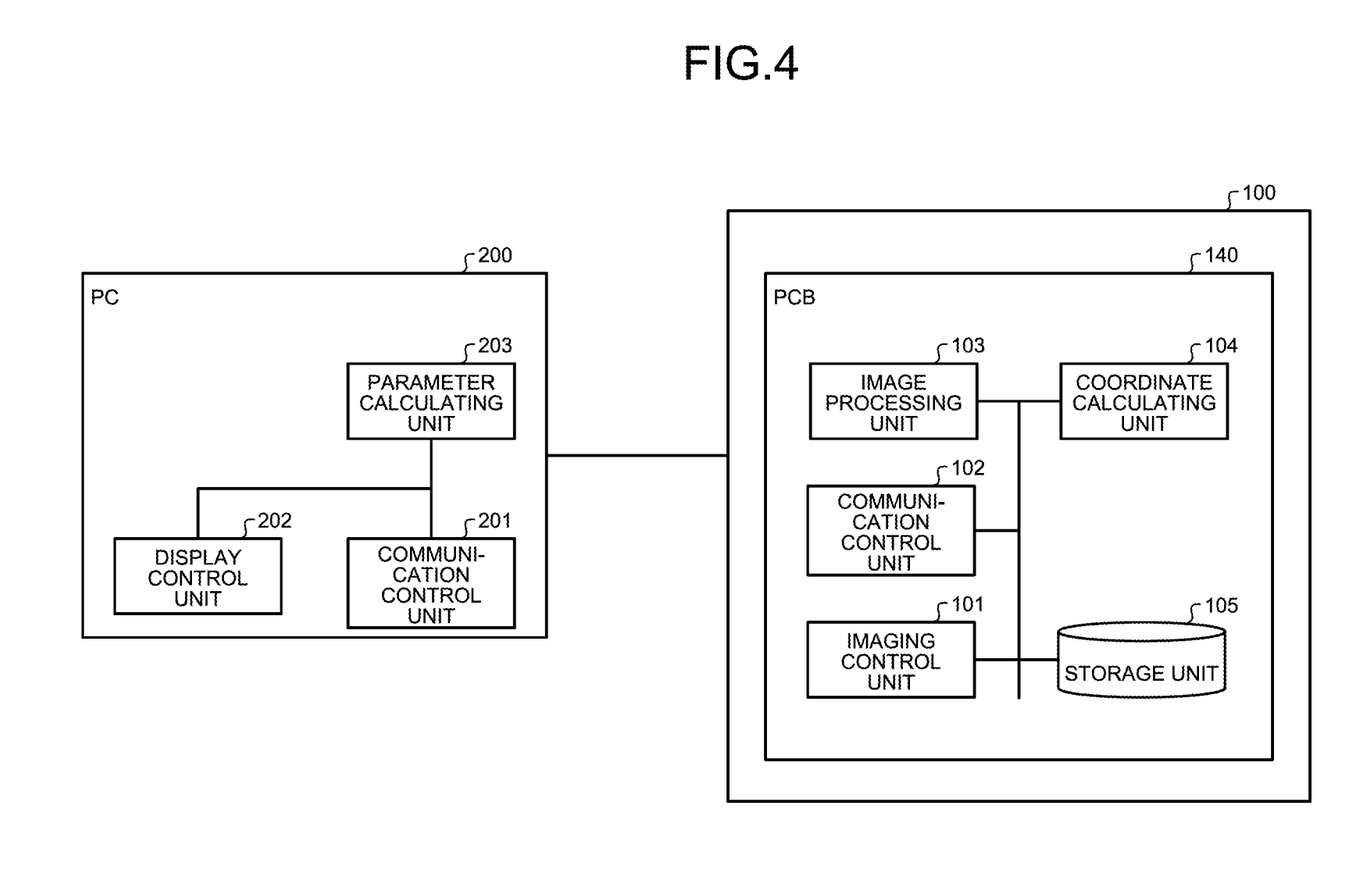
FIG. 4 is a functional block diagram illustrating exemplary configurations of a coordinate calculator and the PC of the embodiment.

Exemplary functional configurations of the IWB 100 (mainly the PCB 140) and the PC 200 will be described. FIG. 4 is a functional block diagram illustrating exemplary configurations of the IWB 100 and the PC 200. As illustrated in FIG. 4, the PCB 140 includes an imaging control unit 101, a communication control unit 102, an image processing unit 103, a coordinate calculating unit 104, and a storage unit 105.

The storage unit 105 stores therein various kinds of information used for various kinds of processing. The storage unit 105 is implemented by, for example, a memory 144 of FIG. 2. The storage unit 105 stores therein, for example, a calibration parameter received from the PC 200. The imaging control unit 101 controls imaging by the cameras 131 and 132.

The communication control unit 102 controls communication with an external device such as the PC 200. For example, the communication control unit 102 transmits and receives information to and from a connected external device in accordance with the USB standard and the like. The communication control unit 102 serves as a transmitter transmitting image coordinates calculated by the later-described image processing unit 103 to the PC 200 using a built-in function included in the OS of the PC 200. The communication control unit 102 further serves as a receiver receiving a calibration parameter calculated by the PC 200 based on the transmitted image coordinates and transmitted by the PC 200 using a built-in function included in the OS of the PC 200.

The image processing unit 103 performs image processing on images captured by the cameras 131 and 132. The image processing unit 103 can be configured with, for example, image processing circuits 141 and 142 of FIG. 2. The image processing unit 103 calculates coordinates (image coordinates) of an attention point on the image captured by each of the cameras 131 and 132. Examples of the attention point include a position pointed by the tip of the pointer 120.

The image coordinates calculation processing is performed, for example, in the following manner. The image processing unit 103 trims off the background from the captured image and cuts out the pointer 120 based on the features (the shape, color, brightness, and the like) of the pointer 120. The image processing unit 103 further calculates the center point, the center of gravity, and the like based on a binary large object (Blob) corresponding to the pointer 120 and outputs the results as image coordinates.

The coordinate calculating unit 104 calculates world coordinates of the pointer 120 based on a calibration parameter and the image coordinates calculated by the image processing unit 103. The coordinate calculating unit 104 can be implemented by, for example, the coordinate calculating circuit 143 of FIG. 2.

As illustrated in FIG. 4, the PC 200 includes a communication control unit 201, a display control unit 202, and a parameter calculating unit 203.

The communication control unit 201 controls communication with an external device such as the IWB 100. The communication control unit 201 serves as a transmitter transmitting a calibration parameter calculated by the parameter calculating unit 203 to the IWB 100. The display control unit 202 controls display of various kinds of information on the display 21, the display 110 of the IWB 100, and others. The parameter calculating unit 203 calculates a calibration parameter based on the image coordinates received from the IWB 100.

The communication control unit 201, the display control unit 202, and the parameter calculating unit 203 may be implemented by causing a processing device such as the CPU 11 to execute a computer program, in other words, by software, by hardware such as an integrated circuit (IC), or by both software and hardware.

Figure 5:
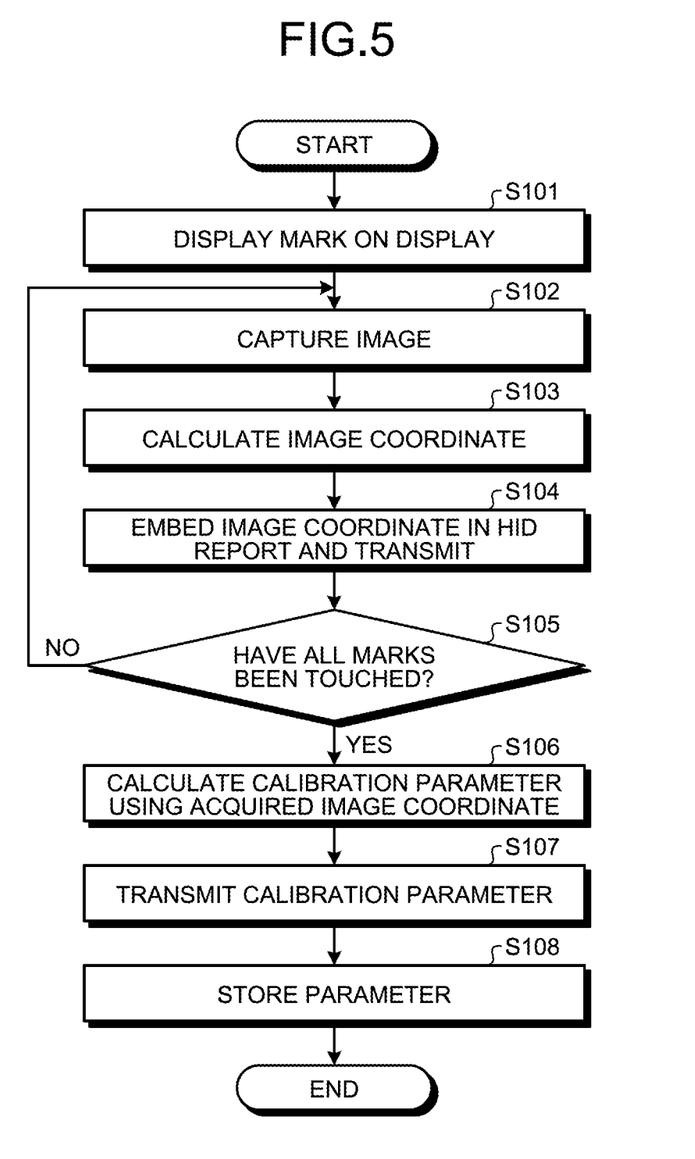
FIG. 5 is a flowchart illustrating an example of parameter calculation processing in the embodiment.
Figure 6:
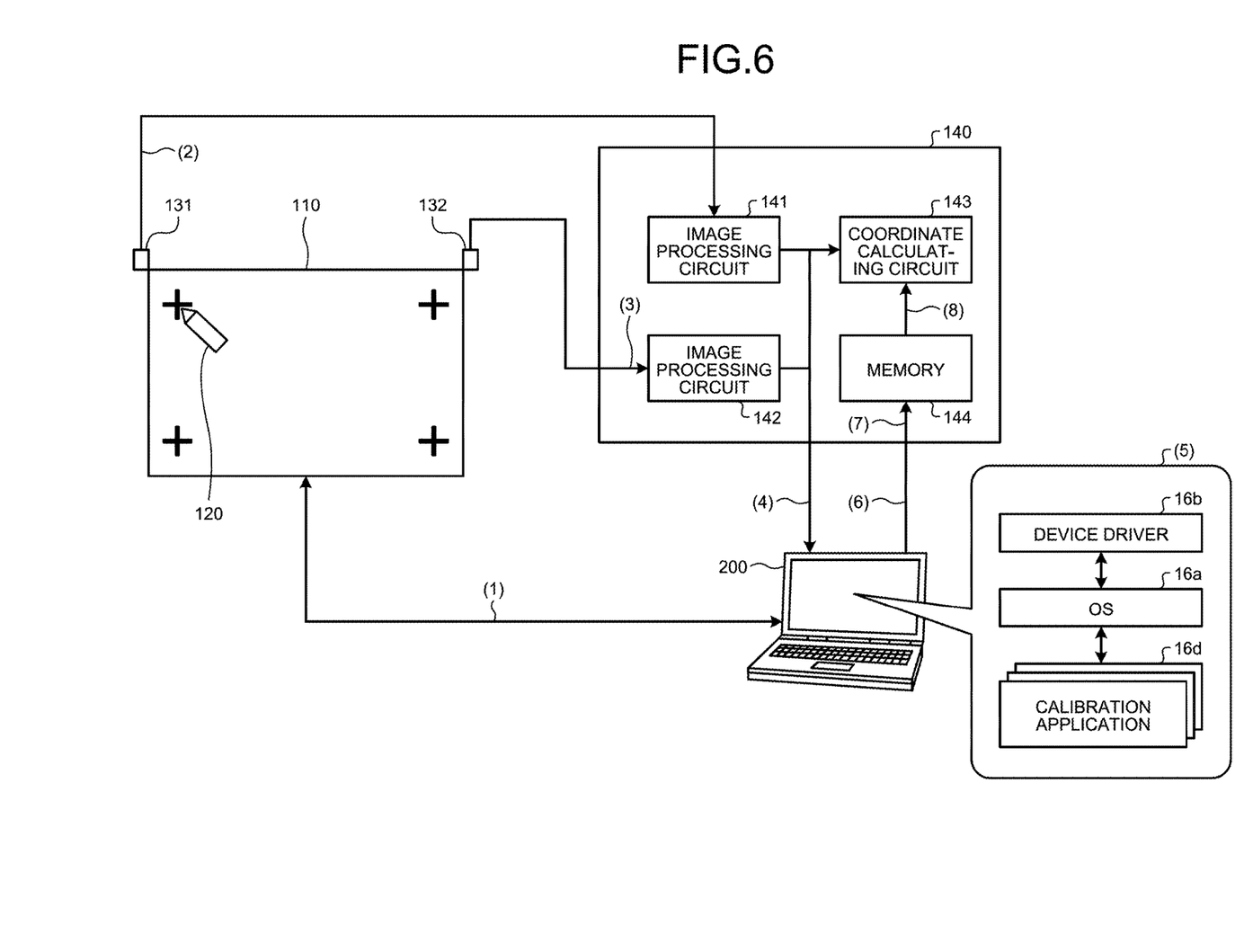
FIG. 6 is an illustrative drawing of a flow of the parameter calculation processing in the embodiment.

Parameter calculation processing in the coordinate calculation system configured as above according to the embodiment will now be described with reference to FIGS. 5 to 7. FIG. 5 is a flowchart illustrating an example of the parameter calculation processing in the embodiment. FIG. 6 is an illustrative drawing of a flow of the parameter calculation processing.

The parameter calculation processing starts, for example, upon execution of a calibration application 16d as one of application programs 16c on the PC 200. The calibration application 16d is an application (software) including functions of the above-described communication control unit 201, display control unit 202, parameter calculating unit 203, and the like and executing processing for calculating a calibration parameter. The calibration application 16d may be an application included in the above-described various kinds of application programs 16c and may be an application operating on the OS 16a.

The case with the calibration application 16d executing parameter calculation processing will now be described as an example. As described above, a part of or the whole of the parameter calculation processing may be implemented by hardware.

The calibration application 16d (the display control unit 202) displays a mark image on the display 110 of the IWB 100 (Step S101, FIG. 6 (1)). The calibration application 16d instructs the display 110 to display the mark image through, for example, a display cable. In FIG. 6, a plus mark displayed at each of the four corners of the display 110 corresponds to the mark image. Any shape of the mark is applicable.

A user touches (instructs) the displayed marks with the pointer 120. Any display order and any number of displayed marks are applicable. For example, all marks may be displayed together, and the user may sequentially touch the displayed marks. In another example, the marks are displayed one by one, and the user may sequentially touch each displayed mark.

The calibration application 16d causes the cameras 131 and 132 to capture images including the pointer 120 through the imaging control unit 101 (Step S102, FIG. 6 (2)). The calibration application 16d may be configured in such a manner that directly controls imaging by the cameras 131 and 132 without having the imaging control unit 101 interposed. In another configuration, without depending on external control, the cameras 131 and 132 may constantly or at appropriate timings capture images and input the images to the image processing unit 103.

The image processing unit 103 (the image processing circuits 141 and 142) receives the captured image and calculates image coordinates based on the received image (Step S103, FIG. 6 (3)). The image processing unit 103 transmits the calculated image coordinates to the PC 200 (Step S104, FIG. 6 (4)).

Any method of transmitting the image coordinates is applicable. For example, as described above, information on the image coordinates may be embedded in an HID report, and the HID report may be transmitted in accordance with the USB standard (for example, via a USB terminal or a USB cable). By transmitting the image coordinates with the method complying with the standard (HID), information can be transmitted regardless of the specification and the like of the PC 200. Specifically, with the image coordinates transmitted in a manner embedded in the HID report, the PC 200 can operate to receive the image coordinates using only a standard driver of Windows (registered trademark). The PC 200 of any type can receive the image coordinates without installing a dedicated driver or the like.

The HID report is a unit for having information gathered. The HID report can periodically forward information using, for example, "GetRawPointerDeviceData", one of built-in functions of Windows. When using two cameras 131 and 132, image coordinates (x1, y1) and image coordinates (x2, y2) are included in the HID report.

Figure 7:
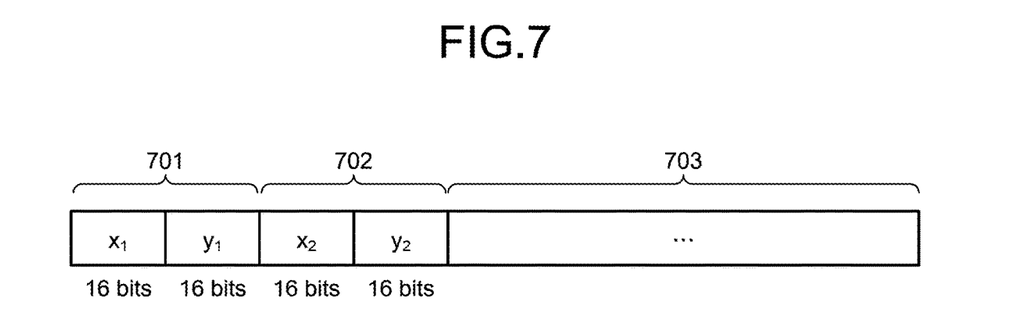
FIG. 7 is a drawing illustrating an example of data configuration of an HID report of the embodiment.

FIG. 7 is a drawing illustrating an example of data configuration of the HID report. The HID report includes data 701, 702, and 703. The data 701 is data indicating image coordinates (x1, y1). The data 702 is data indicating image coordinates (x2, y2). The data 703 indicates other data. The amount of data of each set of image coordinates can be set at, for example, 2 bytes (16 bits).

Referring back to FIGS. 5 and 6, the calibration application 16d determines whether all marks have been touched (Step S105). If not all marks have been touched (No at Step S105), the process returns to Step S102 to repeat processing.

If all marks have been touched (Yes at Step S105), the calibration application 16d (the parameter calculating unit 203) acquires sets of image coordinates embedded in the HID report and calculates a calibration parameter using the acquired sets of image coordinates (Step S106, FIG. 6 (5)).

The calibration parameter may be in any format. For example, a homography matrix (H matrix) associating four sets of image coordinates with world coordinates may be used as a calibration parameter. In this case, the homography matrix can be calculated from four sets of image coordinates obtained by touching at least four marks and the world coordinates. In the case of using another calibration parameter, image coordinates may be calculated using a necessary number of marks for the calibration parameter, and the calibration parameter for transforming image coordinates into world coordinates may be calculated.

The calibration application 16d transmits the calculated calibration parameter to the PCB 140 (Step S107, FIG. 6 (6)). For example, the calibration application 16d can transmit the calibration parameter in the WM_POINTER message of Windows. Because the WM_POINTER message is a standard message of Windows, any type of the PC 200 can transmit the calibration parameter to the IWB 100 without installing a dedicated driver or the like.

The PCB 140 (for example, the communication control unit 102 receives the transmitted calibration parameter and stores the received calibration parameter in the storage unit 105 (Step S108, FIG. 6 (7)). With this process, the calibration (the parameter calculation processing) is completed.

After completion of the calibration, the coordinate calculating unit 104 (the coordinate calculating circuit 143) can calculate the world coordinates (FIG. 6 (8)). For example, upon writing with the pointer 120, the coordinate calculating unit 104 calculates image coordinates of the position indicated by the pointer 120, reads a calibration parameter from the storage unit 105, and calculates world coordinates using the calculated image coordinates and the calibration parameter, regardless of whether the PC 200 is being connected.

Figure 8:
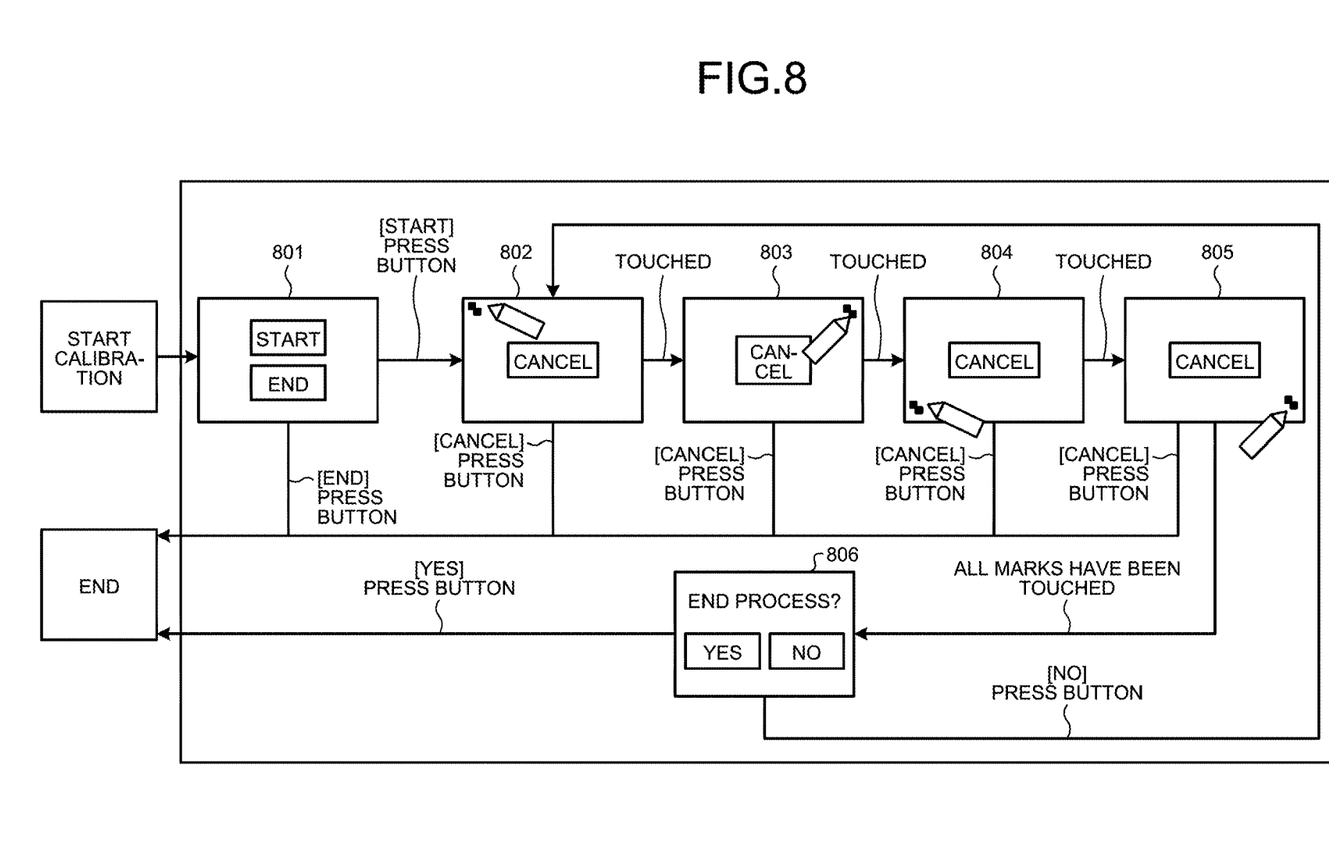
FIG. 8 is a drawing illustrating an example of a user interface of the embodiment.

FIG. 8 is a drawing illustrating an example of a user interface in executing the parameter calculation processing.

When the PC 200 starts calibration (the parameter calculation processing), a main screen 801 is displayed on the display 21 of the PC 200 and the display 110 of the IWB 100 connected via a display cable. Press of an end button on the main screen 801 ends the parameter calculation processing. Upon press of a start button on the main screen 801, at least a mark image from a calibration screen 802 is displayed on the display 110 of the IWB 100. The calibration screen 802 includes a first mark image at the left upper corner. The user touches the displayed mark image with the pointer 120. After the touch, a next calibration screen 803 is displayed. The calibration screen 803 includes another mark image in a position (the right upper corner) different from the position on the calibration screen 802.

Calibration screens 804 and 805 are displayed in the same manner. Press of a cancel button on any of the calibration screens 802 to 805 ends the parameter calculation processing.

In response to a touch on the final calibration screens 805, an end screen 806 is displayed on the display 21 of the PC 200 and the display 110 of the IWB 100 connected via a display cable. Press of a No button on the end screen 806 causes the process to return to the calibration screen 802 to repeat the processing. On the other hand, press of a Yes button on the end screen 806 ends the parameter calculation processing.

In the above-described example, the mark images are displayed one by one. In another case, all the mark images may be displayed together, and the calibration application may determine whether all the mark images have been touched by the pointer 120. If the calibration application determines that each mark image has been touched, the calibration application may display the end screen 806.

According to the embodiment, instead of using a PC, a coordinate calculator reducible in size such as a printed circuit board can execute the coordinate calculation processing and the like. This configuration allows an increase in the processing speed with respect to coordinate calculation and a decrease in size of the parts. Connection with a PC and transmitting and receiving information such as a coordinate value to and from the PC can be executed in accordance with the HID standard and the like. Specifically, when executing calibration after booting the calibration application 16d, data embedded in the HID is transmitted not as world coordinate data indicating the position of the pointer 120 but as data indicating the positional coordinates of a calibration mark used for calibration. On the other hand, while no calibration is executed, the data is transmitted as data indicating world coordinates of the pointer 120 in a manner embedded in the HID report. This configuration requires no dedicated drivers, which enables easy construction of the system and convenient use by users.

The computer program executed by the device of the embodiment is preliminarily embedded in a ROM and others.

The computer program executed by the device of the embodiment may be recorded in a computer-readable recording medium such as a CD-ROM, a flexible disk (FD), a CD-R, a digital versatile disc (DVD) as an installable or executable file and provided as a computer program product.

The computer program executed by the device of the embodiment may be stored in a computer connected to a network such as the Internet and provided by being downloaded via the network. Furthermore, the computer program executed by the device of the embodiment may be provided or distributed via a network such as the Internet.

The computer program executed by the device of the embodiment is in a modularized configuration including the above-described units. As actual hardware, with the CPU (processor) reading the computer program from the ROM and executing the computer program, each of the units is loaded and generated on a main memory.

According to exemplary embodiments of the present invention, the device and the system can be easily configured even when processing relating to coordinate calculation is executed by dedicated hardware.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A coordinate calculating apparatus comprising:
   an input/output (I/O) device;
   a memory; and
   processing circuitry, the processing circuitry configured to,
      calculate a coordinate of an attention point from each of a plurality of images captured by a plurality of image capturing devices,
      transmit, via the I/O device, the coordinate to an information processing device using a built-in function included in an operating system of the information processing device such that the coordinate calculating apparatus is configured to communicate the coordinate to the information processing device using a standard message associated with the operation system of the information processing device without the information processing device having a dedicated driver installed thereon to communicate with the coordinate calculating apparatus,
      receive, via the I/O device, calibration information of the plurality of image capturing devices, the calibration information being calculated by the information processing device based on the coordinate and transmitted by the information processing device using a built-in function included in the operating system of the information processing device such that the coordinate calculating apparatus is configured to receive the calibration information from the information processing device using a standard message associated with the operation system of the information processing device without the information processing device having a dedicated driver installed thereon to communicate with the coordinate calculating apparatus, and
      store, in the memory, the calibration information.

2. The coordinate calculating apparatus according to claim 1, wherein
   the I/O device is configured to utilize an interface complying with a universal serial bus (USB) human interface device (HID); and
   the processing circuitry is configured to embed the coordinate in an HID report, and to transmit, via the I/O device, the HID report including the coordinate to the information processing device such that the coordinate calculating apparatus is configured to communicate the coordinate to the information processing device using the standard message associated with the operation system of the information processing device.

3. The coordinate calculating apparatus according to claim 1, further comprising:
   a display device, wherein
      the processing circuitry is configured to calculate a coordinate of the attention point from each of the images including the attention point instructed on the display device, the images being captured by the plurality of image capturing devices.

4. The coordinate calculating apparatus according to claim 1, wherein
   the processing circuitry is configured to calculate a world coordinate of the attention point based on (i) the calibration information received from the information processing device and stored in the memory and (ii) the coordinate calculated by the processing circuitry.

5. The coordinate calculating apparatus according to claim 1, wherein the processing circuitry is configured to generate the standard message associated with the operation system of the information processing device by embedding the coordinate in the standard message, and to transmit, via the I/O device, the standard message to the information processing device.

6. A coordinate calculation system comprising:
   an information processing device and a coordinate calculating apparatus, wherein
   the coordinate calculating apparatus includes an input/output (I/O) device, a memory; and processing circuitry, the processing circuitry of the coordinate calculating apparatus configured to,
      calculate a coordinate of an attention point from each of a plurality of images captured by a plurality of image capturing devices;
      transmit, via the I/O device, the coordinate to the information processing device using a built-in function included in an operating system of the information processing device such that the coordinate calculating apparatus is configured to communicate the coordinate to the information processing device using a standard message associated with the operation system of the information processing device without the information processing device having a dedicated driver installed thereon to communicate with the coordinate calculating apparatus;
      receive, via the I/O device, calibration information of the plurality of image capturing devices, the calibration information being calculated by the information processing device based on the coordinate and transmitted by the information processing device using a built-in function included in the operating system of the information processing device such that the coordinate calculating apparatus is configured to receive the calibration information from the information processing device using a standard message associated with the operation system of the information processing device without the information processing device having a dedicated driver installed thereon to communicate with the coordinate calculating apparatus; and
      to store, in the memory, the calibration information, and
   the information processing device includes an input/output (I/O) device, a memory; and processing circuitry, the processing circuitry of the information processing device configured to,
calculate the calibration information based on the coordinate received from the coordinate calculating apparatus; and
transmit, via the I/O device of the information processing device the calculated calibration information to the coordinate calculating apparatus.

7. The coordinate calculation system according to claim 6, wherein
the I/O device of the coordinate calculating apparatus is configured to utilize an interface complying with a universal serial bus (USB) human interface device (HID), and
the processing circuitry of the coordinate calculating apparatus is configured to embed the coordinate in an HID report, and to transmit, via the I/O device of the coordinate calculating apparatus, the HID report including the coordinate to the information processing device such that the coordinate calculating apparatus is configured to communicate the coordinate to the information processing device using the standard message associated with the operation system of the information processing device.

8. The coordinate calculation system according to claim 6, wherein the coordinate of the coordinate calculating apparatus further comprises:
a display device, and wherein
the processing circuitry of the coordinate calculating apparatus is configured to calculate a coordinate of the attention point from each of the images including the attention point instructed on the display device, the images being captured by the plurality of image capturing devices.

9. The coordinate calculation system according to claim 6, wherein the processing circuitry of the coordinate calculating apparatus is configured to calculate a world coordinate of the attention point based on (i) the calibration information received from the information processing device and stored in the memory and (ii) the coordinate calculated by the processing circuitry of the coordinate calculating apparatus.

10. The coordinate calculating system according to claim 6, wherein the processing circuitry of the coordinate calculating apparatus is configured to generate the standard message associated with the operation system of the information processing device by embedding the coordinate in the standard message, and to transmit, via the I/O device, the standard message to the information processing device.

* * * * *